(12) United States Patent
Rossignol et al.

(10) Patent No.: US 12,434,902 B2
(45) Date of Patent: Oct. 7, 2025

(54) PISTON FOR A RESERVOIR OF A DISPENSER OF A FLUID PRODUCT WITHOUT AIR INTAKE

(71) Applicant: SILGAN DISPENSING SYSTEMS LE TREPORT S.A.S., Richmond, VA (US)

(72) Inventors: Eric Rossignol, Chalon sur Saone (FR); Emir Ezzina, Montigny-le-Bretonneux (FR); Etienne Briere, Paris (FR)

(73) Assignee: Silgan Dispensing Systems Le Treport S.A.S., Le Treport (FR)

( * ) Notice: Subject to any disclaimer, the term of this patent is extended or adjusted under 35 U.S.C. 154(b) by 24 days.

(21) Appl. No.: 18/211,422

(22) Filed: Jun. 19, 2023

(65) Prior Publication Data

US 2023/0331459 A1    Oct. 19, 2023

Related U.S. Application Data

(60) Division of application No. 17/836,433, filed on Jun. 9, 2022, now Pat. No. 11,718,465, which is a continuation of application No. 16/417,431, filed on May 20, 2019, now Pat. No. 11,370,597.

(30) Foreign Application Priority Data

May 18, 2018   (FR) ........................................ 1854168

(51) Int. Cl.
   *B65D 83/76*    (2025.01)

(52) U.S. Cl.
   CPC ............................. *B65D 83/765* (2025.01)

(58) Field of Classification Search
   CPC ... F16J 1/003; F16J 1/008; F16J 15/56; B65D 83/765
   See application file for complete search history.

(56) References Cited

U.S. PATENT DOCUMENTS

| | | | |
|---|---|---|---|
| 8,505,785 B2 * | 8/2013 | Helmenstein | B65D 83/0005 222/326 |
| 8,556,130 B2 * | 10/2013 | Law | B05B 11/1047 222/256 |
| 11,718,465 B2 * | 8/2023 | Rossignol | B65D 83/0005 222/386 |

* cited by examiner

*Primary Examiner* — Kenneth Bomberg
*Assistant Examiner* — Daniel S Collins
(74) *Attorney, Agent, or Firm* — Hinckley, Allen & Snyder; Stephen Holmes

(57) ABSTRACT

A piston for a reservoir of a dispenser of a fluid product without air intake, and presenting a central axis X includes both sealing means and also guiding means. The sealing means extend in a plane orthogonal to the axis X and define a single external sealing line in a closed loop, distal from the axis X, capable of coming into contact with an inner wall of the reservoir 10. The guiding means include a base from which extends one or more tabs with free ends defining external guide points, distal from the axis X, capable of coming into contact with the inner wall of the reservoir.

10 Claims, 12 Drawing Sheets

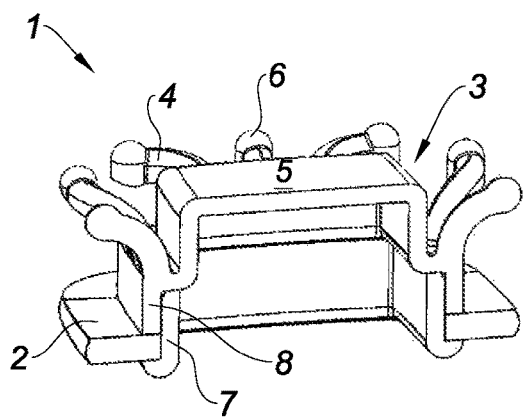
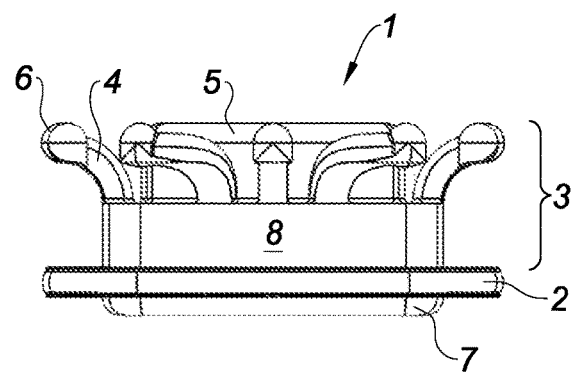
Fig. 2a　　　　　　　Fig. 2b
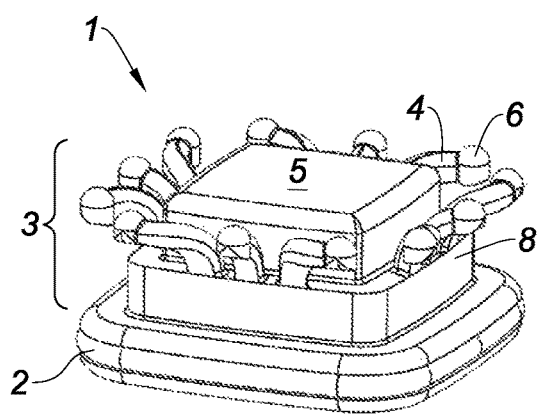
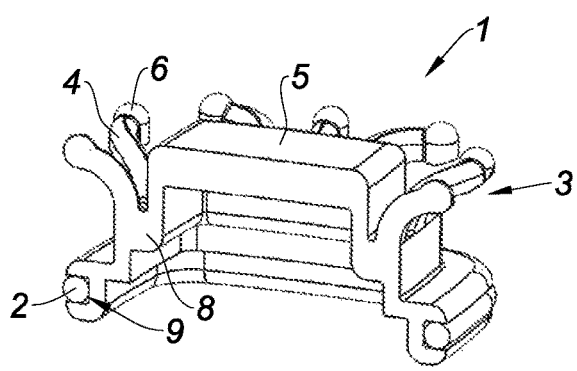
Fig. 3a　　　　　　　Fig. 3b

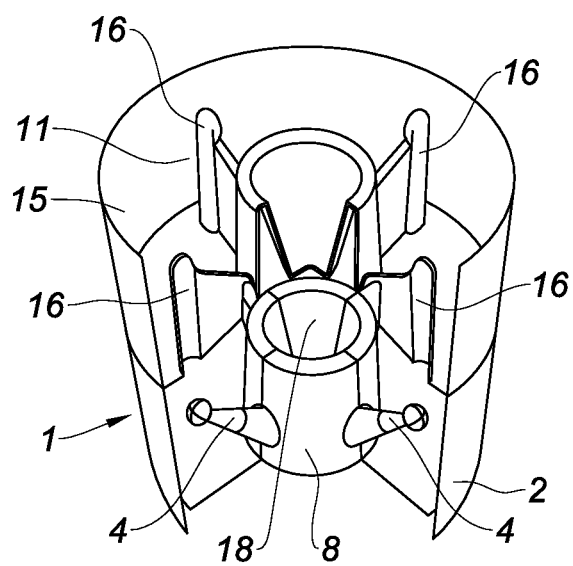
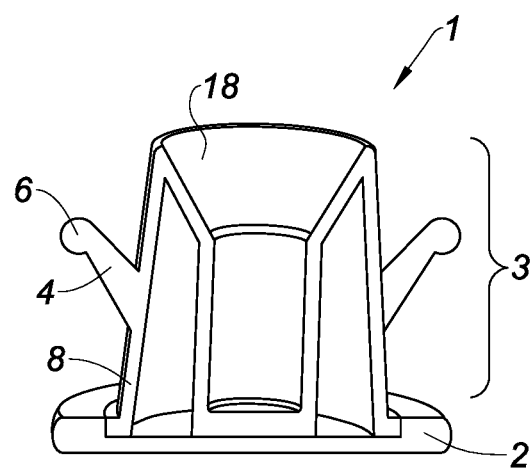
Fig. 5a    Fig. 5b
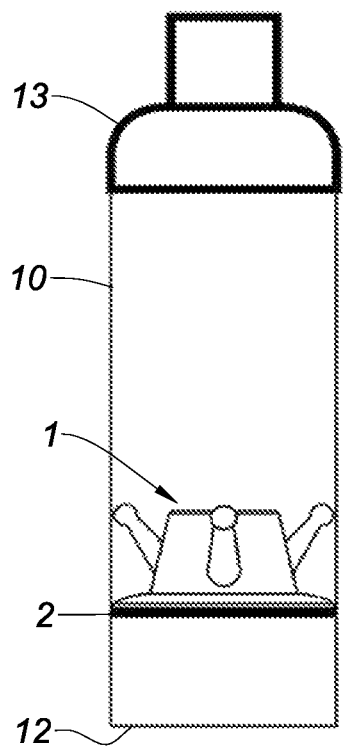
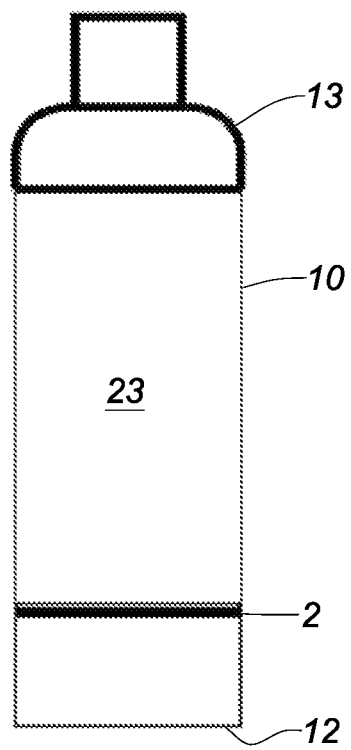
Fig. 5c    Fig. 5d

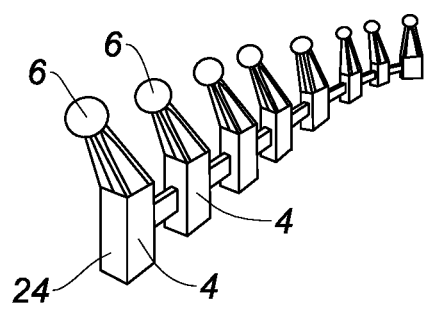
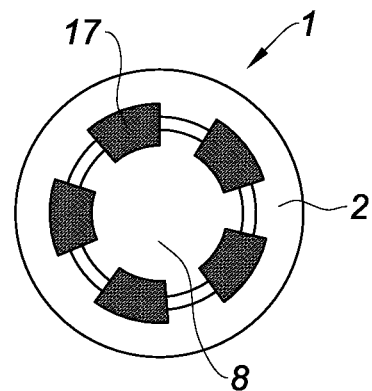
Fig. 11a    Fig. 11b
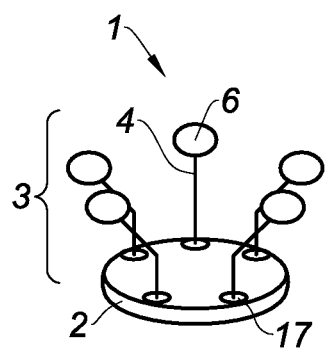
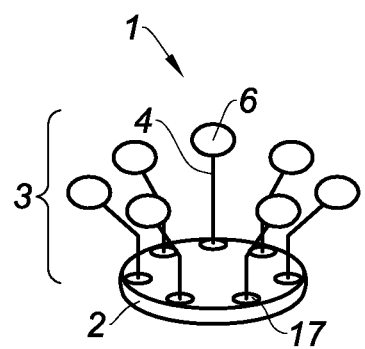
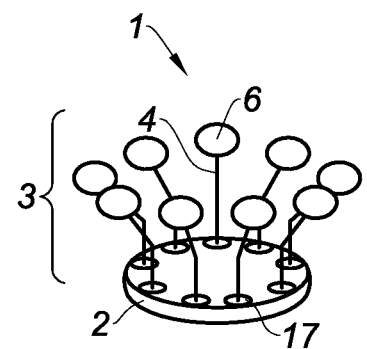
Fig. 11c    Fig. 11d    Fig. 11e

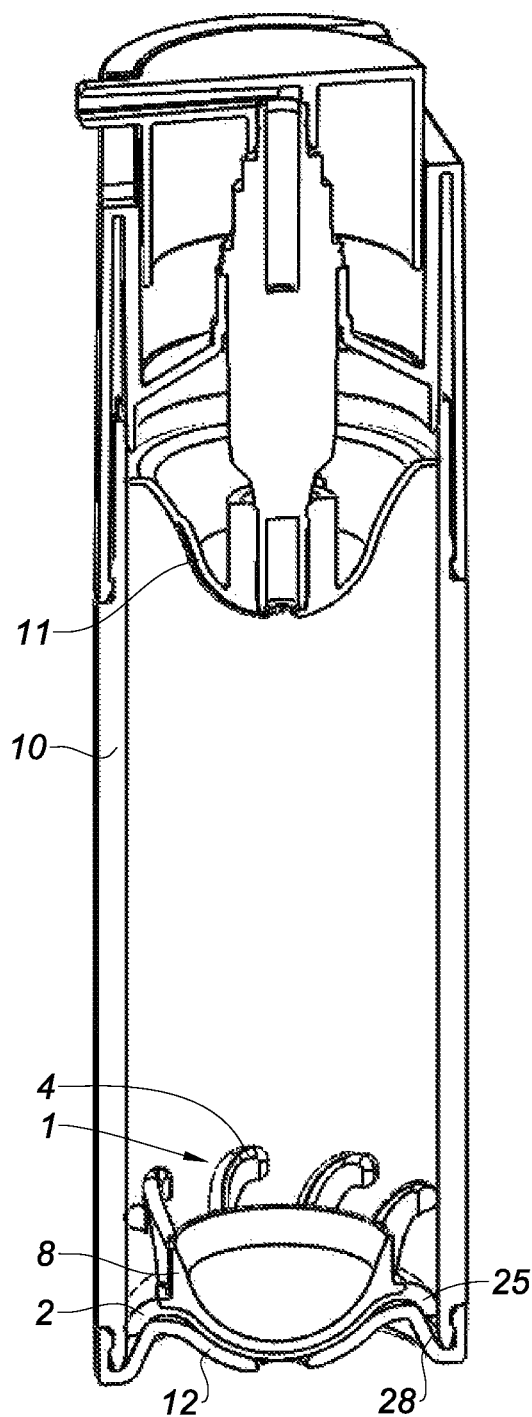
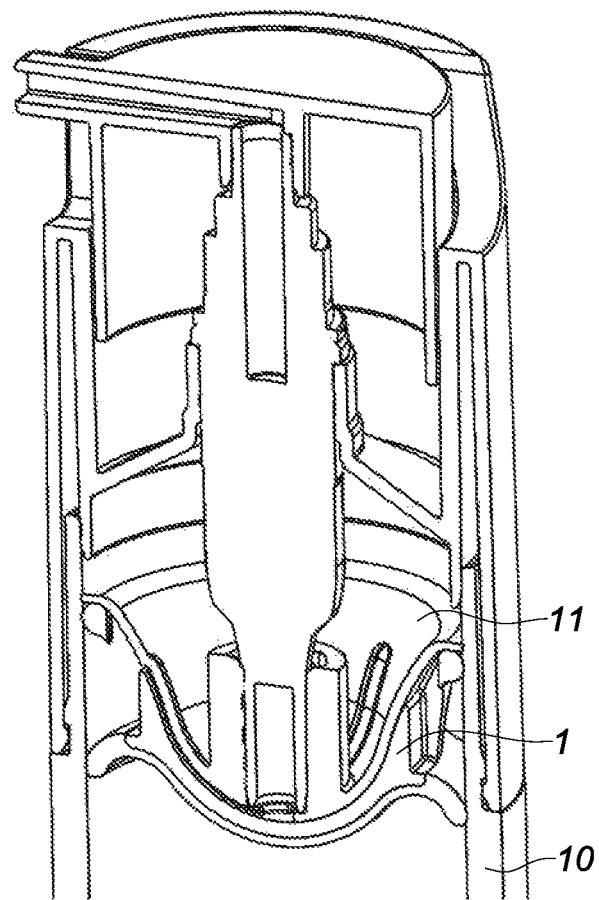
Fig. 13b
Fig. 13c

PISTON FOR A RESERVOIR OF A DISPENSER OF A FLUID PRODUCT WITHOUT AIR INTAKE

CROSS REFERENCE TO RELATED APPLICATIONS

This application is a Divisional application of U.S. application Ser. No. 17/836,433 entitled "PISTON FOR A RESERVOIR OF A DISPENSER OF A FLUID PRODUCT WITHOUT AIR INTAKE" filed 9 Jun. 2022, now allowed, which is a Continuation application of U.S. application Ser. No. 16/417,431 entitled "PISTON FOR A RESERVOIR OF A DISPENSER OF A FLUID PRODUCT WITHOUT AIR INTAKE" filed 20 May 2019, now U.S. Pat. No. 11,370,597, which claims priority under 35 U.S.C. § 119(a) to French Patent Application Serial Number 1854168, filed May 18, 2018; the disclosures of each of the priority applications are incorporated herein by reference.

BACKGROUND OF THE INVENTION

Field of the Invention

The present invention relates to a piston for a reservoir of a dispenser of a fluid product of the lotion, gel, perfume or cream type for example, used for cosmetic purposes or for pharmaceutical treatments, the dispenser lacking of an air intake, and more particularly to a dispenser of a fluid product without air intake that includes a reservoir capable of storing the fluid product and housing such a piston.

Description of the Related Art

Dispensers without air intake (called "airless" because of the absence of air in the reservoir) are provided with pistons called "followers". They are in contact with the product and rise back with each dispensing operation under the effect of depression in the reservoir induced by this dispensing operation.

These pistons generally include two sealing lips pressed against the side wall of the reservoir, axially spaced from one another in order to further ensure a function of guiding the piston in its stroke in the reservoir. Indeed, the latter must remain oriented so that the piston/wall sealing line remains in a plane substantially orthogonal to the direction of movement of the piston. The lips exert a flat support effort against the inner wall of the reservoir, each forming an ungainly sealing crown presenting a certain height, corresponding to the height of the lip, and well visible from the exterior of the reservoir.

The volume between the two lips is constituted of air and makes the side surface of the piston that extends which extends between these two lips perfectly visible when the walls of the reservoir are transparent or translucent.

The reservoir is preferably made of plastic, for example of PETG (glycolyzed polyethylene terephthalate). The reservoir can also be made of glass. In this case, the dimensional tolerance is more difficult to respect. A stretched glass method is then preferred for respect of dimensional tolerances questions.

The piston is a visible and ungainly mechanical element, perceived as being trivially functional, and does not correspond to the image of certain prestigious cosmetic product brands. The problem to be solved is therefore to hide the piston, to make it invisible or to turn it into a mobile aesthetic element within the reservoir.

BRIEF SUMMARY OF THE INVENTION

The purpose of the present invention consists of eliminating or at least minimize the effect of the piston as a visible and ungainly mechanical element. More specifically, the present invention has for purpose to overcome the various disadvantages mentioned above, by means of a piston for a reservoir of a fluid product dispenser without air intake, featuring a central axis X and conventionally including:
  sealing means;
  guiding means.

This piston is characterized primarily in that said sealing means extend in a plane orthogonal to the axis X and define a single external sealing line in a closed loop, distal from the axis X, capable of coming into contact with an inner wall of the reservoir, and in that said guiding means include a base from which extend a plurality of tabs presenting free ends defining external guide points, distal from the axis X, capable of coming into contact with the inner wall of the reservoir.

The main idea of this invention consists of providing a piston that includes a minimum contact surface with the inner wall of the reservoir.

The side ends of the piston are composed only of the external sealing line, and the external guide points. Only these side ends are in contact with the reservoir and will be therefore visible to the user of the dispenser from the exterior. Finally, there is only one single contact line and the contact points that will be visible to the user through the reservoir.

Indeed, the existence of tabs to guide the piston enables the fluid product to insert itself between the tabs and all around the base, so as to camouflage at best the piston. There is therefore no more air volume between the two seals, as was the case in the prior art, where the piston body was then well visible.

The piston of the present invention no longer forms an ungainly sealing crown visible from the exterior of a reservoir. In the claimed piston, the sealing means define one single external sealing line. This single line is thus very discrete compared to the two crowns of the prior art.

In the same way, the external guide points are very discrete, and hardly visible to the user through the reservoir.

According to the different embodiments of the invention, that can be taken together or separately:
  said sealing means develop around said base.
  the piston features at least three tabs: this enables to prevent a tilting of the piston in the reservoir.
  the guiding means are primarily designed in a rigid material such as PP, PCTA or PET, while the sealing means are designed in a flexible material of the type SEBS, very low density PE or polyurethane: the sealing means must be able to be crush against the inner wall of the reservoir, in order to form a seal and that the fluid product contained in the reservoir cannot bypass the piston.
  the free ends of the guiding means are designed in a flexible material such as PE or PTFE: this enables the tabs to absorb the radial dimensional dispersions of the inner wall of the reservoir against which they are in contact. In this case, the radial dimensional tolerances of the reservoirs can be less drastic. The same applies to the radial dimensional tolerances of the pistons.

the piston may consist of a single part obtained by the injection of one or several materials: it can be a mono-injected part, a bi-injected part or a tri-injected part, for example.

the piston can consist of a plurality of parts assembled for example by gluing, snap-fitting or force-fitting.

the free end of the tabs feature a curved shape: this shape enables to ensure only a quasi-point contact with the inner wall of the reservoir, and facilitates sliding.

the free end of the tabs features a sliding zone: this sliding zone corresponds to a small surface, of the skid type, which makes it possible to ensure a point contact that is slightly more important than in the previous version with the curved shape, with the inner wall of the reservoir. This sliding zone improve the sliding of the piston inside the reservoir, but the contact point between the piston and the reservoir is slightly greater. The piston loses in invisibility what it gains in guiding.

the free ends of the tabs are distributed homogeneously, at an equal distance from one another: they allow a homogeneous support all around the inner wall of the reservoir.

the free ends of the tabs are all contained in one single plane P orthogonal to the axis X and at a distance from the sealing means: the tabs ensure a perfectly horizontal positioning of the piston within the reservoir. They are sufficiently far from the sealing means, such that the contact points with the reservoir are at a distance from the contact line, to ensure optimal guiding of the piston inside the reservoir, without risk of tilting of the piston.

the piston includes microbiocidal properties: more specifically, the piston is made from at least one material that presents microbiocidal properties by diffusion of an antimicrobial agent, by contact with a microbiostatic agent and/or by irradiation at an adapted radiation wavelength.

the sealing means consist of a flexible flange extending around the base of the piston.

the sealing means consist of a O-ring inserted in a groove provided for this purpose, in the base of the piston.

the sealing means consist of a flexible lip: in this case, the lip will be dimensioned so that only a small area comes into contact with the inner walls of the vial, so as to form an external sealing line, and not an external sealing crown.

the sealing means consist of a flexible disk whose periphery is curved in the direction opposite to the tabs, said periphery forming a sealing lip.

said base includes a full central part, mounted on said disk, the base and the disk each presenting a central part with a concave aspect, the central part of said disk following the profile of the central part of the base.

said base corresponding to a crown defining a central cavity, the disk presenting a central part with a convex aspect penetrating inside the central cavity of the base.

the central part of the disk with the convex aspect is capable of being inverted to take a concave aspect.

the piston presents rectilinear sides connected in pairs by rounded segments: the piston can be for example in the form of a rounded square, a triangle or other.

the piston features a circular shape.

The invention further relates to an dispenser of a fluid product without air intake including a reservoir capable of storing the fluid product and housing a piston such as described above, the reservoir presenting a bottom and a neck located opposite the bottom, said sealing means of the piston being in contact with an inner wall of the reservoir forming a contact line, and the free ends of the tabs being in contact with the inner wall of the reservoir forming contact points.

According to the different embodiments of the invention, that can be taken together or separately:

the piston moves in the reservoir between a lower proximal position of the bottom of the reservoir and a proximal upper position of the neck of the reservoir, the dispenser presenting a complementary form to the piston in the vicinity of the neck of the reservoir: this complementary form houses the upper part of the piston and thus limits the dead volume between the upper part of the piston and the top of the reservoir where there still is fluid whilst the piston reaches an abutted position at the end of the stroke. The dispensed volume rate of the fluid product is thus improved.

said complementary form is achieved in the actual neck of the reservoir: the reservoir itself features the female complementary form of the piston guiding means.

said complementary form is achieved in a ring mounted on or in the neck of the reservoir: for example, the ring penetrates in the neck of the reservoir, and the piston then fits into the ring.

said complementary form presents ramps for the guiding and radial indexing of the tabs: in particular, when the reservoir presents a cylindrical inner wall, it is possible that the piston is not initially positioned so that the tabs are located in vis-√†-vis to the female forms where they are intended to be housed within the complementary form at the end of the piston stroke, or it is possible that the piston rotates slightly when it moves up the reservoir, causing a misalignment of the tabs relative to the female forms. It is therefore necessary to guide each tab towards its respective female form. V-shaped tilted walls are therefore provided between the adjacent female forms, in order to guide each tab towards one of the female forms, and then to index angularly the tabs with respect to the female forms, and that the piston finally inserts itself correctly into the general complementary form. Concretely, the tabs slide along the ramps, leading to a rotation of the piston during its axial displacement as it reaches the end of stroke, inducing the self-alignment of the guiding means of the piston with the complementary form. The guiding means are thus themselves guided.

the tabs are retractable when they come into contact with the neck of the reservoir or with a ring mounted on the neck of the reservoir: the tabs can be flexible and deformable, or can be foldable, for example. In this case, it is not necessary to provide a complementary form in the upper part of the reservoir, either in the neck or in the ring. With this technique, it is possible to keep sufficient axial extension of the tabs with respect to the sealing means to ensure efficient guiding. The advantage of retractable tabs is that the stroke of the piston is greater than with non-deformable tabs, because there is no space lost by a complementary form, and thus the surface of the reservoir available to the cosmetician for display (product name, etc.) is increased.

the piston is composed of a material presenting a refractive index ranging from 1.36 to 1.44: this is a transparent material, used in particular when the fluid product is transparent, such as the perfume which is essentially composed of ketones and alcohols. The piston is therefore "invisible" in the perfume.

the piston is designed in a material that contains fluorine.

- the piston is coated with a decoration, of the film type, affixed to at least one part of its outer surface, except for the sealing line: if the decoration is of a different colour than that of the fluid product, then the piston is visible but becomes a mobile decorative element in the reservoir, and is no longer associated with a mechanical element. If the decoration is of a colour adjusted to that of the fluid product, when the latter is transparent and coloured, then the piston is always "invisible". For example, the piston can be decorated over its entire external surface, except for the sealing line, by a decorative film.
- the piston is designed in an intrinsically coloured material: when the fluid product is transparent and coloured, the piston can be of a colour adjusted to the colour of the fluid product, by the use of a material that enables this colouring.
- the tabs of the piston are oriented towards the neck of the reservoir: in this case, the tabs are immersed in the fluid product.
- the tabs of the piston are oriented towards the bottom of the reservoir: in this case, the tabs will not abut at the end of the stroke against the top part of the reservoir. Only the base surface oriented towards the neck of the reservoir will abut at the end of the stroke. In this case, the tabs are located under the sealing means, and are not in contact with the fluid product, and are therefore well visible. Preferably, the piston will be in this case decorated.
- the sealing means consist of a flexible flange extending around the base of the piston, and matching the inner form of the reservoir: the flange can be square, round, a rounded square, triangular, etc.
- the sealing means of the piston include a sealing lip, the bottom of the reservoir presenting a peripheral recess wherein said sealing lip is housed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIGS. 2a to 2b represent a piston according to a second embodiment of the invention;

FIGS. 3a to 3b represent a piston according to a third embodiment of the invention;

FIGS. 5a to 5d represent a piston and its complementary form according to a fourth embodiment of the invention;

FIGS. 11a to 11e represent the piston according to a tenth embodiment of the invention;

FIGS. 13a to 13c represent the piston and its integration within the reservoir according to a twelfth embodiment of the invention;

DETAILED DESCRIPTION OF THE INVENTION

Figure 1A:
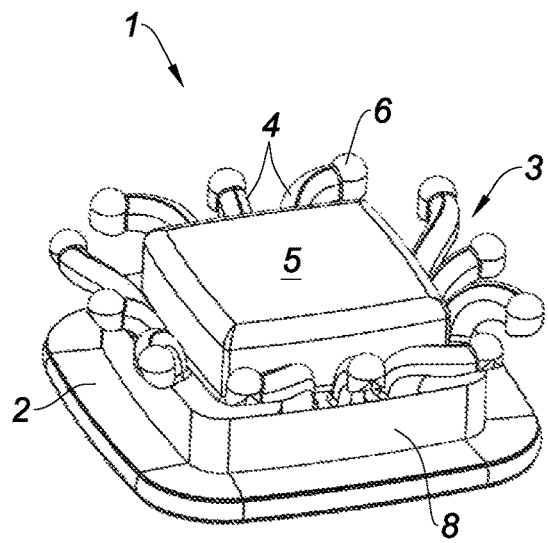
FIGS. 1a to 1d represent a piston according to a first embodiment of the invention.
Figure 1B:
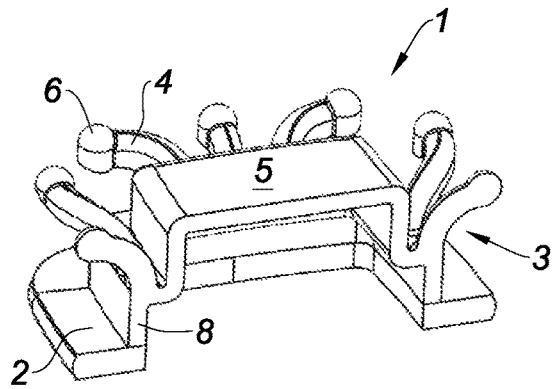

In the following description, elements presenting an identical structure or similar functions are designated by the same references.

Dispensers without air intake, called "airless" (absence of air in the reservoir 10), are provided with pistons called "followers". They are in contact with the product and rise back, with each dispensing operation, under the effect of the depression in the reservoir induced by the dispensing operation. Several embodiments of such pistons according to the invention are described below.

With reference to all figures, the piston 1 includes in particular sealing means 2 and guiding means 3. These sealing means 2 and these guiding means 3 present ends that define an outer shell of the piston 1, capable to coincide with the internal volume of a reservoir 10 wherein the piston 1 is introduced.

In particular, if the inner wall 14 of the reservoir 10 is of a cylindrical shape, then the outer shell of the piston 1 is also of a cylindrical shape.

In the same way, if the inner wall 14 of the reservoir 10 defines a square, rectangular or triangular transversal cross-section, then the sealing means 2 of the piston 1 will define a square, rectangular or triangular cross-section and so will the guiding means 3, so that the piston 1 inserts itself perfectly within the reservoir 10 and comes into contact with the side inner walls 14 of the reservoir 10.

The sealing means 2 of the piston 1 make it possible to divide the reservoir 10 into two zones sealed with respect to one another. In particular, when the reservoir 10 contains a fluid product, the sealing means 2 enable the fluid product contained in a first zone, for example above the piston 1, to not bypass the piston 1 and to not reach the second zone located in this case below the piston 1.

The guiding means 3 of the piston 1 make it possible to maintain the piston 1 in a transversally stable position inside the reservoir 10, and make it possible for the piston 1 to move axially inside the reservoir 10 while remaining in stable positions inside the reservoir 10 over its entire stroke range.

FIGS. 1a to 1d illustrate a first embodiment of the piston 1 according to the invention;

In this first embodiment, the piston 1 has a rounded square shape, i.e. it is a square with rounded corners.

This piston 1 includes a base 8 from which extend twelve guiding tabs 4 each ended by a free end 6 of a rounded shape. The base 8 presents four faces, three tabs 4 extending from each face. On each face:

- a tab 4 extends at the centre of the face;
- a tab 4 extends at the periphery of the face and towards an adjacent rounded corner, for example this tab 4 extends to the left of the face and towards the left corner;
- a tab 4 extends at the periphery of the face and towards another adjacent rounded corner, for example this tab 4 extends to the right of the face towards the right corner.

The rounded forms of all of the tabs 4 are located at the same plane, i.e. at the same height with respect to the base 8.

Each face includes the same number of tabs 4, with the same orientations and with the same shapes.

The more tabs 4, the smaller the risk of the piston 1 tilting in the reservoir 10.

The base 8 and the tabs 4 form what is called as the guiding means 3 of the piston 1.

Around the base 8 extends an annular flange that forms what is called as the sealing means 2 of the piston 1.

Figure 1C:
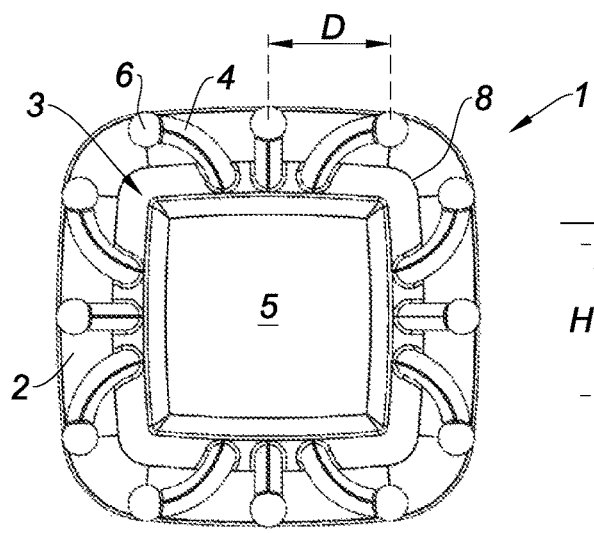
Figure 1D:
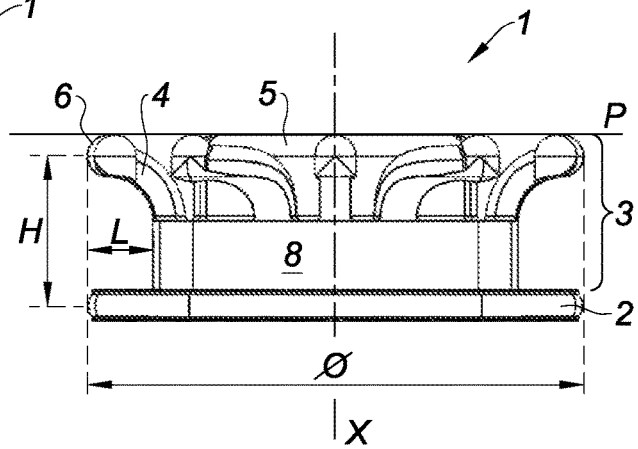

The piston 1 includes a central axis X as defined in FIG. 1d. The tabs 4 extend about this axis X and are located in a same plane P transversal to this axis X.

Figure 4A:
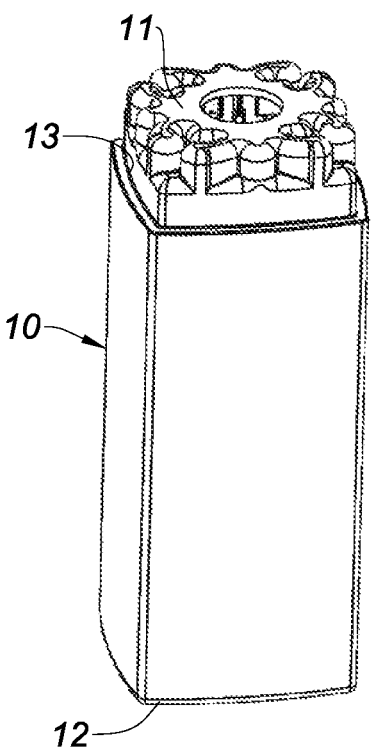
FIGS. 4a to 4c represent a reservoir including a complementary form capable to receive a piston according to the first, second and third embodiments of the invention.
Figure 4B:
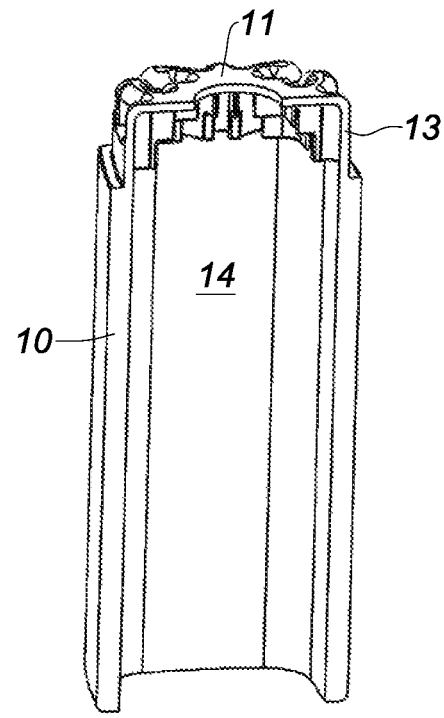
Figure 4C:
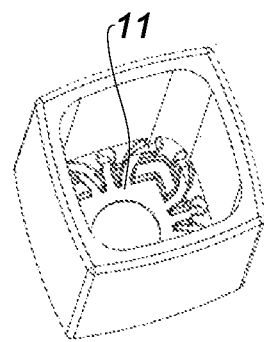
Figure 4D:
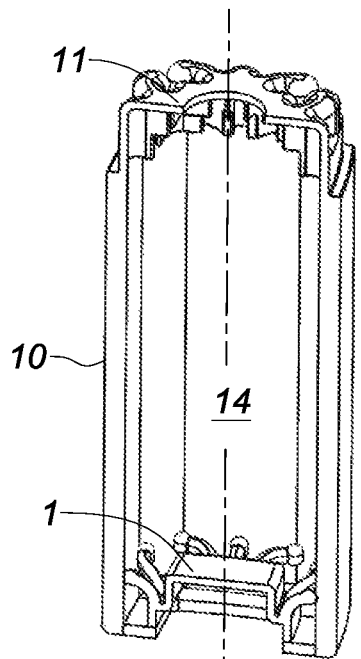
FIG. 4d represents the piston in its initial position at the bottom of the reservoir, as illustrated in FIGS. 4a to 4c.

When the piston 1 is inserted inside a reservoir 10, as is for example illustrated in FIG. 4d, it is well visible that the flange is in contact with the inner side walls 14 of the reservoir 10, and the rounded forms 6 of the tabs 4 are also in contact with the inner side walls 14 of the reservoir 10.

The flange presents a domed periphery, so as to form only one single external contact line with the reservoir 10. This line is very discrete when the piston 1 is observed through the transparent or translucent reservoir 10.

The rounded forms 6 of the tabs 4 each form a point contact with the inner walls 14 of the reservoir 10. These point contacts consist of larger or smaller points depending on the form of the rounded part, and are therefore also very discrete visually from the exterior of the reservoir 10.

The greater the diameter of the rounded part, the greater the contact point. Inversely, the smaller the diameter of the rounded part, the smaller the contact point. It is also possible to consider small skid-type surfaces at the end of the tabs 4. The contact point is slightly bigger, but the piston 1 is better guided.

In the end, when the piston 1 is inserted inside the reservoir 10, the user will only see an external line and a plurality of points, in this case three per face, through the wall of the reservoir 10.

The tabs 4 extend sufficient far from the sealing means 2 in order to ensure better stability in the motion of the piston 1 within the reservoir 10 and to prevent any risk of tilting of the piston 1.

More precisely, here are the dimensional parameters, such as illustrated in FIGS. 1c and 1d:

H=axial distance between one guide contact point and one sealing contact point located just underneath.
Ø=the greatest dimension of the sealing means 2.
L=transversal length of a tab 4 between its end attached to the base 8 and its free end 6.
D=distance between the free ends 6 of two adjacent tabs 4.

Preferably, H/Ø>¼: this makes it possible to obtain a good guiding.

Figure 4E:
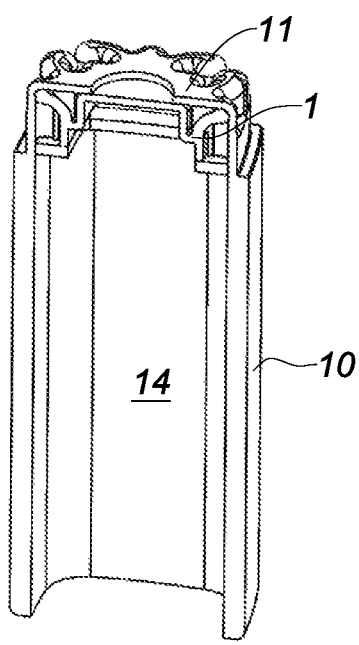
FIG. 4e represents the piston in its final position at the top of the reservoir, as illustrated in FIGS. 4a to 4c.

The parameter L conditions the thickness e of fluid product concealing the piston 1:

for a highly opaque product, it can be envisaged a small thickness (e= or <1 mm)
for a more translucent product, the selected thickness is 1<e<3 mm will be chosen A greater thickness would lead to a volume of product impossible to restore at the end of the use of the dispenser, as it is illustrated in FIG. 4e and explained below.

The tabs 4 must ensure the upper guiding of the piston 1 by means of point supports, replacing a conventionally continuous lip.

The length of the tabs 4 from the contact point 6 to the base conditions their flexibility intended to absorb dimensional variations due:

to manufacturing tolerances;
to the diameter variation between the bottom of the reservoir and the top of the reservoir owing to the internal volume of the reservoir.

The length L of the tabs 4 must be:

sufficiently important to give the necessary elasticity to the absorption of dimensional variations;
sufficiently short to ensure a minimum of rigidity and to ensure the guiding function and prevent the tilting of piston 1.

It is a compromise.

For example:

Ø is included between 20 and 30 mm. In this mode, Ø=23.8 mm.
H is included between 6 mm and 9 mm. In this mode, H=7.25 mm.
D is included between 5 mm and 10 mm. In this mode, D=7 mm.
L is included between 2.5 mm and 4 mm. In this mode, L=3.15 mm.

In this mode, the volume of non-restorable product located between the base 8 and the inner wall 14 of the reservoir 10 is preferably less than 3 ml, and more preferably less than 2 ml. In this mode, the volume is 2 ml.

In the case of FIG. 4d, the piston 1 is located at the bottom 12 of the reservoir 10, in the initial position. When fluid product is poured inside the reservoir 10, this product is comes to rest on top of the piston 1 and is inserted between the tabs 4, so as to conceal them.

As product is dispensed from this reservoir 10, thanks to dispensing means including for example a pump and a push button mounted on the reservoir, all forming a dispenser, the piston 1 rises back along the reservoir 10 until it reaches a top abutment towards the upper end of the reservoir 10, corresponding to a neck 13, that is located opposite the bottom 12 of the reservoir 10, as this is illustrated in FIG. 4e.

To avoid there being a large dead volume between the guiding means 3 of the piston 1 and the upper end 13 of the reservoir 10, i.e. a large dead volume wherein there remains fluid product that cannot be dispensed as the piston 1 is already in an abutted position of end of stroke, it is expected to equip the piston 1 with a form 5 to fill this dead volume and whose top surface is located in the plane P wherein are all the rounded parts 6 of the tabs 4.

In the first embodiment of the invention, this form 5 consists of a cube 5 extending axially between the tabs 4. The upper surface of the cube 5 has the same axial position as the end of the tabs 4. The cube 5 comes into contact with the upper end 13 of the reservoir 10. This cube 5 therefore aims to improve the dispensing rate of fluid product by reducing the dead volume, i.e. by preventing that stored product between the tabs 4 is impossible to dispense when the piston 1 is in the top position, i.e. at the end of the stroke.

However, there will always be a ring with a thickness L (as explained above) located under the tabs 4 that cannot be dispensed, despite the complementary form 11 of the upper end 13.

The piston 1 is made by bi-injection.

In this case, the piston 1 includes:

a rigid part made of the tabs 4, the cube 5 and the base 8, that is made of a rigid material such as PP (polypropylene), that is a material ranging from white to translucent and is well suited to this use of a discrete piston when the cosmetic formula inside the reservoir is opaque. However, for translucent products, the use of PCTA (polycyclohexylene dimethylene terephthalate acid), which is an ultra-transparent polymer presenting the aspect of a crystal, will be preferred. Alternatively, it is also possible to consider for the rigid part the use of PET (polyethylene terephthalate) or PETG (polyethylene terephthalate glycol-modified), which are also transparent. In addition, the advantage of PCTA over other transparent polymers, such as PMMA, is a better chemical compatibility with cosmetic formulas contained inside the reservoir.

a flexible part composed of the sealing flange that is made of SEBS (polystyrene-b-poly(ethylene-butylene)-b-polystyrene) or of very low density polyethylene, or of polyurethane. It is also possible to make the flexible part with a TPE (thermoplastic elastomer). The flexible part is overmoulded on the rigid part.

Alternatively, the piston 1 can be made by tri-injection, with the rounded parts 6 of the tabs 4 constituted of a third material that can be more flexible than the rest of the guiding means 3, in order to absorb the radial dimensional dispersions of the inner walls 14 of the reservoir 10 inside of which it moves. Thus, the radial dimensional tolerances can be less drastic in this case.

As an alternative, this third material can aim to improve the friction of the guiding means 3 on the walls of the reservoir 10. Thus, with a reservoir 10 made of PETG (polyethylene terephthalate glycol-modified), it is possible to have contact parts of the guiding means 3 made of PE (polyethylene) or of PTFE (polytetrafluoroethylene, marketed under the name of Teflon). The piston 1 can therefore be made by tri-injection (SEBS/PP/PTFE).

Finally, for transparent or translucent cosmetic products, it is preferable for the guiding means 3 a material itself transparent, such as PETG (polyethylene terephthalate glycol-modified).

In the second embodiment of the piston 1 according to the invention, represented in FIGS. 2a and 2b, the piston 1 consists of three assembled parts. The sealing means 2 and the guiding means 3 are thus found again as in the first embodiment, to which is added a connecting part 7 force-fitted in the guiding means 3. More specifically, this connecting part 7 is of the shape of a rounded square, and has outer dimensions that are slightly more important than the inner dimensions of the base 8. It should be noted that the base 8 is a hollow part. The base 8 thus accommodates within it, by force-fitting, the connecting part 7. The sealing means 2 are sandwiched between the connecting part 7 and the base 8.

In the third embodiment of the piston 1 according to the invention, represented in FIGS. 3a and 3b, the piston 1 consists of a mono-injected part to which is added an O-ring or an X-ring 2. This seal 2 constitutes the sealing means 2.

In this case, the piston 1 consists of one single rigid part, preferably made of PP (polypropylene) made by mono-injection, and including a recess 9 wherein is inserted the O-ring 2 sealing the piston 1 on the inner wall of reservoir 10. Such an O-ring or X-ring 2, for example made of silicone, has the advantage of providing a good elastic response regardless of the local curvature of the reservoir 10 (i.e. round, square or rounded square, triangular or other, with or without rounded corners), both along straight parts and rounded parts.

In these above three reviewed embodiments, the piston 1 has the same general external aspect, and presents an improved dispensing rate thanks to the cube 5 protruding from the base 8. This dispensing rate is also improved thanks to the presence of a female form 11 fitting with the guiding means 3 of the piston 1 present at the upper end 13 of the reservoir, i.e. opposite the bottom 12 of the reservoir 10.

This complementary form 11 can be provided directly in the neck 13 of the reservoir 10, or in a ring 15 cooperating with the neck 13 of the reservoir 10. In all cases, it is a surface against which the piston 1 abuts at the end of stroke. This surface presents a form 11 that is complementary to that of the piston 1.

Such a complementary form 11 is visible in FIGS. 4a to 4c. The upper end 13 of the reservoir 10 is provided with this female complementary form. It includes troughs and cavities wherein the tabs 4, their rounded ends 6 and the cube 5 protruding from the piston 1 are housed. Thanks to this complementarity, there is nearly no more fluid trapped between the piston 1 and the upper part 13 of the reservoir 10 when the piston 1 arrives in an abutted position at the end of the stroke, as it is visible on FIG. 4e.

In FIGS. 4a to 4e, the guiding means 3 of the piston 1 are oriented towards the upper part of the reservoir 10, and the piston 1 translates from the bottom 12 of the reservoir 10 towards the upper part 13 of the reservoir 10, until it houses itself in the female form 11 provided for this purpose.

In these three embodiments, a flat pump with a deformable membrane, fixed flat on the top of the reservoir 10, and that does therefore not penetrate in the reservoir 10, is used.

In the fourth embodiment of the piston 1 according to the invention, represented in FIGS. 5a and 5b, the piston 1 presents a round profile and not a rounded square.

In this case, its base 8 is frustoconical and it includes four tabs 4 extending obliquely from the base 8 and are distributed equidistantly from each other all around the base 8.

This base 8 presents a cylindrical central orifice extending by a frustoconical central orifice 18 that flares out towards the upper end of the base 8, i.e. in the direction of the top 13 of the reservoir 10.

The sealing means 2 consist of a flat sealing disk wherein the base 8 positions itself, the latter being fixed to the disk by gluing.

However, like the first embodiment, the piston could be formed by bi-injection instead of the gluing.

The piston 1 is capable of being housed in a female complementary form 11 provided for this purpose, not in the upper part 13 of the reservoir 10, but in a ring 15 mounted in the upper part 13 of the reservoir 10 and wherein it is possible to secure a pump for dispensing the fluid product. This ring 15 penetrates in the reservoir 10.

This female complementary form 11 includes a central frustoconical part being housed in the central frustoconical orifice 18 of the base 8, and includes four hollow fins 16 inside of which the tabs 4 of the piston 1 can be housed. The cylindrical central orifice is meanwhile provided to house the body of the pump that is plunged in the reservoir 10.

In FIG. 5*c*, the piston is mounted in the reservoir 10. There is not fluid product, and the piston is therefore fully visible from the exterior, and in particular the sealing line formed by the sealing means 2 and the guide points formed by the free ends 6 of the tabs 4 can be seen.

When an opaque lotion 23 is poured into the reservoir 10, it surrounds the piston 1 and the latter becomes invisible. Only the sealing line remains visible. The guide points are also invisible.

In this fourth embodiment, the main disadvantage is that the piston 1 needs to be angularly indexed with respect to the ring 15 when it is mounted in the reservoir 10, so that, at the end of the stroke of the piston 1, the male and female forms are one vis-a-vis the other, i.e. the tabs 4 of the piston 1 are in vis-a-vis of the fins 16 of the ring 15.

Figure 6A:
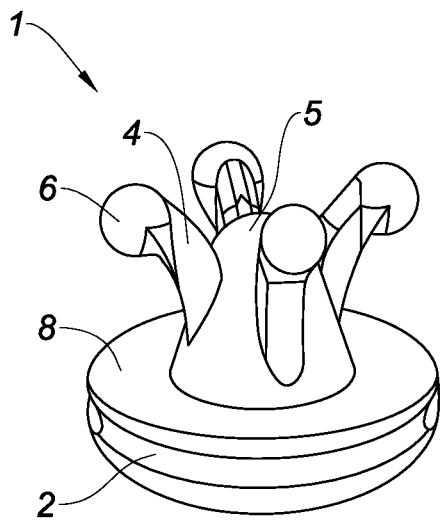
FIGS. 6a to 6b represent the piston and its complementary form according to a fifth embodiment of the invention.
Figure 6B:
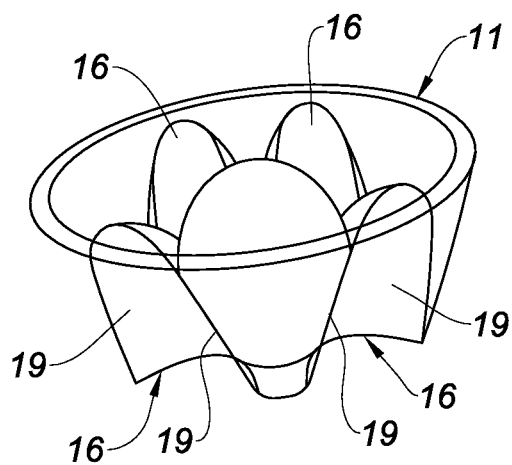

Hence the idea for the fifth embodiment of the piston 1 according to the invention, represented in FIGS. 6*a* and 6*b*, where the female complementary form 11, wherein the piston 1 comes to be housed, is provided with V-shaped ramps 19 connecting two adjacent fins 16 in order to be able to guide the tabs 4 in the fins 16 by indexing them correctly. More specifically, the ring 15 is provided with tilted walls 19 whereon the guiding tabs 4 of the piston 1 rest, which leads to a rotation of the piston 1 during its axial motion inside the reservoir 10, inducing a self-alignment of the structures of the guiding means 3 with the female structure of the ring 15. Thus, the guiding means 3 are themselves guided.

In this fifth embodiment, the piston 1 is, for example, made by mono-injection, and includes a recess 9 wherein is inserted the O-ring 2, sealing the piston 1 against the inner wall of reservoir 10.

The piston 1 presents a round profile. Contrary to the fourth embodiment, the piston 1 does not include a central orifice, but instead includes a protruding form 5 intended to limit the dead volume, as it was the case for the first three embodiments.

This form 5 corresponds to an ovoid segment, from which the four guiding tabs 4 extend directly.

The complementary form 11 therefore contains an ovoid cavity to house the form 5, as well as four fins 16 to house the tabs 4.

Thanks to the ramps 19 provided between the fins 16, it is possible to initially position the piston 1 within the reservoir 10 without any angular indexing, the ramps 19 fulfilling this angular indexing function at the end of the stroke of the piston 1.

Figure 7:
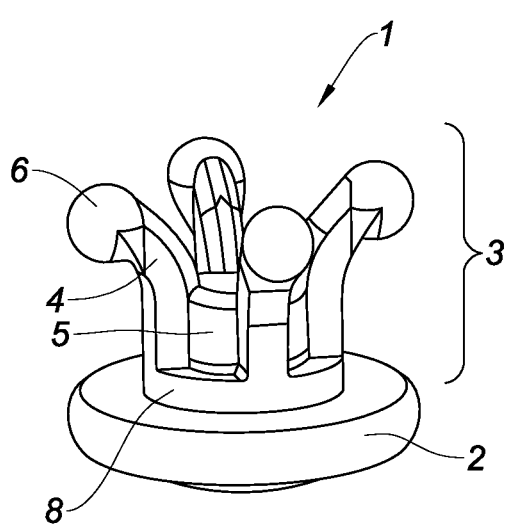
FIG. 7 represents the piston according to a sixth embodiment of the invention.

In the sixth embodiment of the piston 1 according to the invention, represented in FIG. 7, the piston 1 presents a circular cross-section and is therefore mounted in a reservoir 10 with a round cross-section. This piston 1 includes a cylindrical base 8 from which four tabs 4 extend equidistantly around the base 8. A cylindrical form 5 protrudes from the base 8 along the tabs 4 to improve the dispensing rate of the fluid product. The sealing means 2 extend all around the base 8 and consist more precisely of a disk 2 whereon the base 8 rests.

In another version, the tabs 4 could protrude from the disk 2 directly, the disk 2 in itself then constituting the base 8. In this case, the sealing means 2 and the base 8 are merged. This can be the case in other embodiments mentioned in the present description.

As in the case of the first embodiment, the piston 1 consists of a single part that can be bi-injected or tri-injected.

Figure 8:
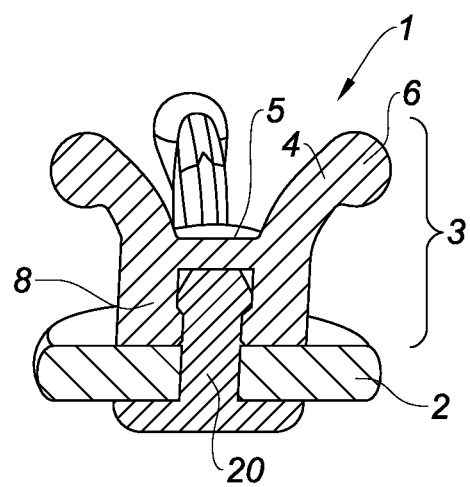
FIG. 8 represents the piston according to a seventh embodiment of the invention.

In the seventh embodiment of the piston 1 according to the invention, represented in FIG. 8, the piston 1 has an outer shape equivalent to that of the sixth embodiment.

In this case, the piston 1 is made of three parts, as it was the case in the second embodiment, with a connecting part 20 which is not force-fitted in this case, but snap-fitted into the base 8 of the guiding means 3. The sealing means 2 are sandwiched between the connecting part 20 and the base 8.

Figure 9:
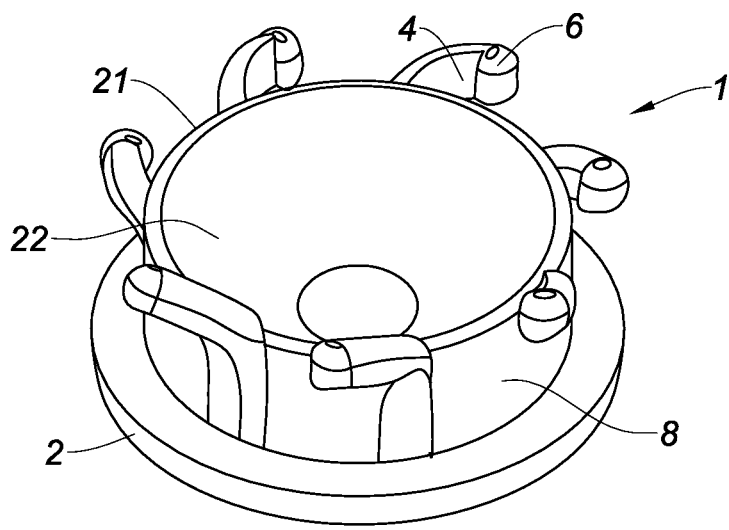
FIG. 9 represents the piston according to an eighth embodiment of the invention.

In the eighth embodiment of the piston 1 according to the invention, represented in FIG. 9, the piston 1 also presents a circular cross-section.

The piston 1 includes a cylindrical base 8 presenting an upper periphery 21 from which extend the guiding tabs 4. In the present case, there are seven guiding tabs 4. These tabs 4 are oriented tangentially to the base 8, all of them in the same direction of rotation.

This piston 1 presents a hollow upper face 22 in the shape of a truncated cone, to house a bleed ring (not represented) mounted at the end of a pump (not represented).

This piston 1 consists of a single part, obtained by bi-injection or by tri-injection.

Figure 10A:
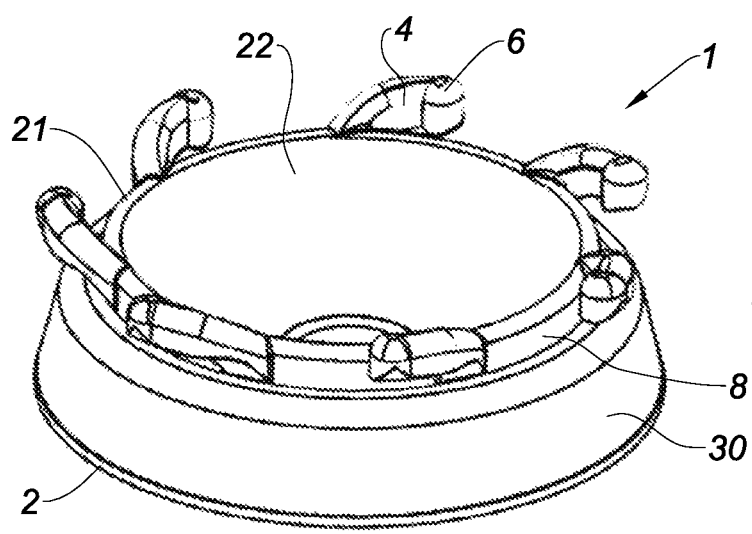
FIGS. 10a to 10b represent the piston according to a ninth embodiment of the invention.
Figure 10B:
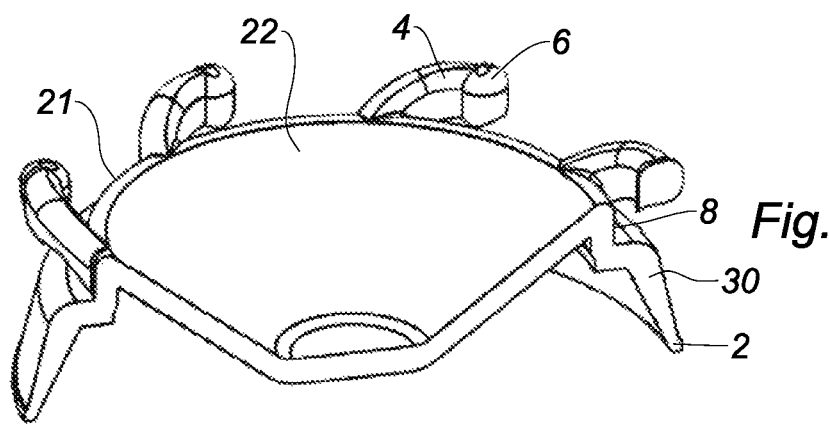

The ninth embodiment of the piston 1 according to the invention, represented in FIGS. 10*a* to 10*b*, is close to the eighth embodiment of FIG. 9.

The piston 1 also presents a circular cross-section.

The piston 1 includes a cylindrical base 8 presenting an upper periphery 21 from which extend the guiding tabs 4. In the present case, there are seven guiding tabs 4. These tabs 4 are oriented tangentially to the base 8, all of them in the same direction of rotation.

This piston 1 presents a hollow upper face 22 in the shape of a truncated cone, to house a bleed ring (not represented) mounted at the end of a pump (not represented).

This ninth embodiment distinguished itself from the eighth embodiment in that the sealing means 2 are constituted of a flexible sleeve 30 tightly mounted in the reservoir. The end of the sleeve 30 forms a sealing lip capable of being pressed against the inner wall of the reservoir.

The sealing means 2 thus have a geometry that provide them with increased flexibility with respect to the sealing means 2 of the eighth embodiment. It is therefore possible to make these sealing means 2, as well as the remainder of the piston 1, in polyethylene (PE). Thus, this piston 1 is made of a single material by mono-injection. This geometry including the flexible sleeve 30 thus enables to simplify the injection method with respect to the other embodiments, whilst retaining good performances in terms of sealing and guiding.

In the tenth embodiment of the piston 1 according to the invention, represented in FIGS. 11*a* to 11*e*, the piston 1 is made in a modular manner.

First of all, a mould produces a ribbon of guiding tabs 4, which extend from a baseplate 24, for example with a square, rectangular or circular cross-section, as it is visible in FIG. 11*a*. Preferably, these tabs 4 are connected between them by a breakable bond.

Moreover, a piston 1 having the form of a circular disk (or the form of a rounded square or other) that serves as a base 8, is provided with housings 17 capable of housing the baseplates 24 of the guiding tabs 4, as it is represented in FIG. 11*b*.

The baseplates 24 of the tabs 4 are force-fitted or snap-fitted in the housings 17.

This modular embodiment makes it possible to equip, with the same guiding tabs 4, pistons 1 of different diameters and different cross-sections. A piston 1 of greater perimeter will therefore be equipped with a greater number of tabs 4.

Thus, in FIG. 11c, the piston 1 presents a small diameter and is equipped of five tabs 4. In FIG. 11d, the piston 1 presents a medium diameter and is equipped of seven tabs 4. Finally, in FIG. 11e, the piston 1 presents a large diameter and is equipped of nine tabs 4.

Figure 12A:
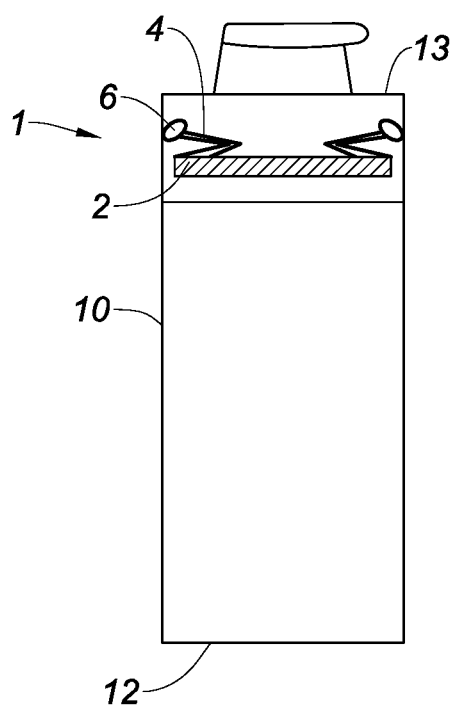
FIGS. 12a to 12b represent the piston according to an eleventh embodiment of the invention.
Figure 12B:
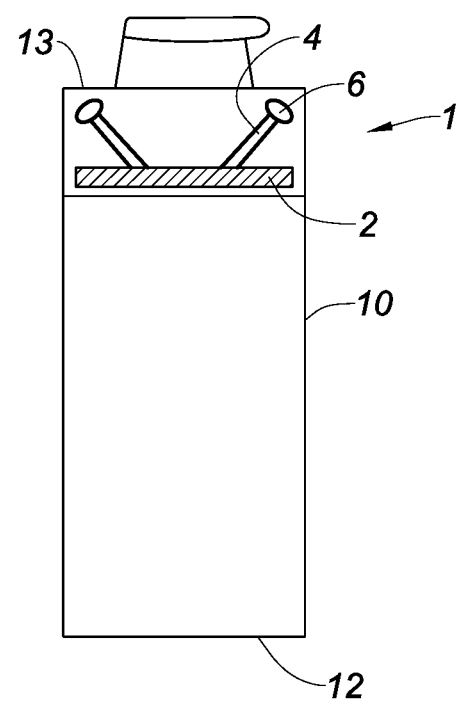

In the eleventh embodiment of the piston 1 according to the invention, represented in FIGS. 12a and 12b, the piston 1 includes retractable, foldable or flexible guiding means 3.

In order to improve the product dispensing rate, on the one hand, by economising on the female complementary form embodiment of the guiding means 3 on the ring 15 mounted on the pump or on the reservoir 10 of the product, and on the other hand, by retaining a sufficient axial extension of the guiding means 3 for efficient guiding operations, it is possible to provide flexible or hinge-articulated tabs 4 capable of folding back when they come to an abutted position at the top 13 of the reservoir 10. Another advantage resides in that, the range of stroke of the piston 1 being greater than with non-deformable stems, the surface of the reservoir 10 available to cosmeticians for display purposes is increased.

In the embodiments 1 to 11, it would also be possible to rotate the piston 1 in the reservoir 10, i.e. to ensure that the guiding means 3 are oriented towards the bottom 12 of the reservoir 10. In this case, the guiding means 3 are not in contact with the fluid product contained in the reservoir 10. Only the base 8 and the sealing flange 2 are in contact with the fluid product.

In this case, the base 8 is closed with a surface oriented in the same plane as the flange, in order to provide a homogeneous platform whereon the fluid product deposits itself. Instead of providing a relatively complicated female complementary form, it will be necessary just to close the top 13 of the reservoir 10 with a flat surface against which the platform of the piston 1 will come into contact, in order to achieve a flat-contact between the two surfaces and to ensure that all of the fluid is dispensed through the outlet orifice of the reservoir 10.

Figure 13A:
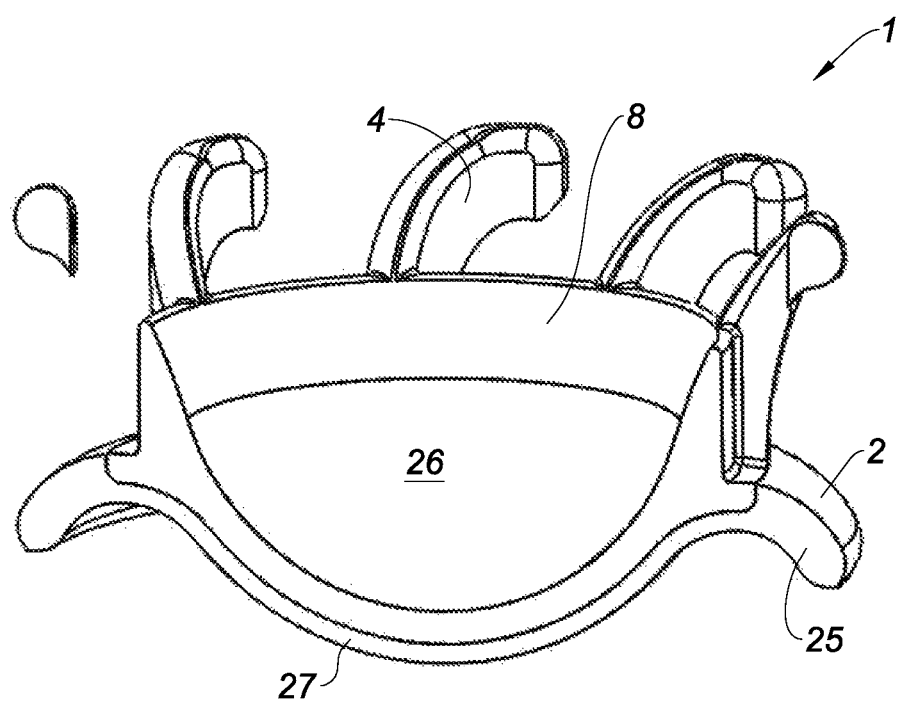

The twelfth embodiment of the piston 1 according to the invention, represented in FIGS. 13a to 13c, is close to the ninth embodiment of FIGS. 10a and 10b.

The piston 1 presents a circular cross-section.

The piston 1 includes a cylindrical base 8, corresponding to a crown. The guiding tabs 4 extend from the outer surface of the crown. These tabs 4 are oriented tangentially to the base 8, all of them in the same direction of rotation.

The central part 26 of the crown is full, in the shape of a bowl, i.e. concave, so as to define a housing wherein another part of the dispenser is housed by complementary form. This other part generally consists of a bleed ring 11, which fits snugly with the piston 1 at the end of dispensing operations (i.e. in the top position of the piston), so as to offer the highest possible product dispensing rate. Indeed, when the forms are complementary, there is no product trapped in the top position of the piston, as it is represented in FIG. 13c. In this case, the piston 1 comes into contact with the bleed ring 11.

The sealing means 2 consist of a flexible disk 2, whose periphery is curved in a direction opposite to that of the tabs, said periphery forming a sealing lip 25.

The base 8 is mounted on said disk 2. The base 8 and the disk 2 each present a central part with a concave profile, the central part 27 of said disk 2 according to the profile of the central part 26 of the base 8.

In this twelfth embodiment of the piston, the central part 26 of the base 8 is located under the sealing line formed by the sealing lip 25. This central part 26 is thus clearly visible through the reservoir 10. In addition, this central part 26 increases the total height of the vial. As the piston 1 is more voluminous, it uses space that is normally dedicated for cosmetic products. It is therefore necessary to increase the size of the reservoir 10 to house the quantity of cosmetic product initially planned.

Figure 14A:
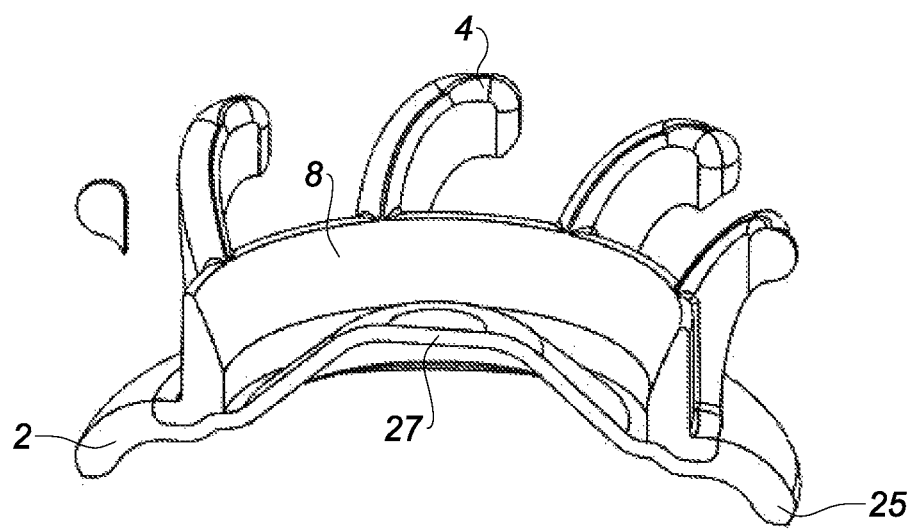
FIGS. 14a to 14c represent the piston and its integration within the reservoir according to a thirteenth embodiment of the invention.
Figure 14B:
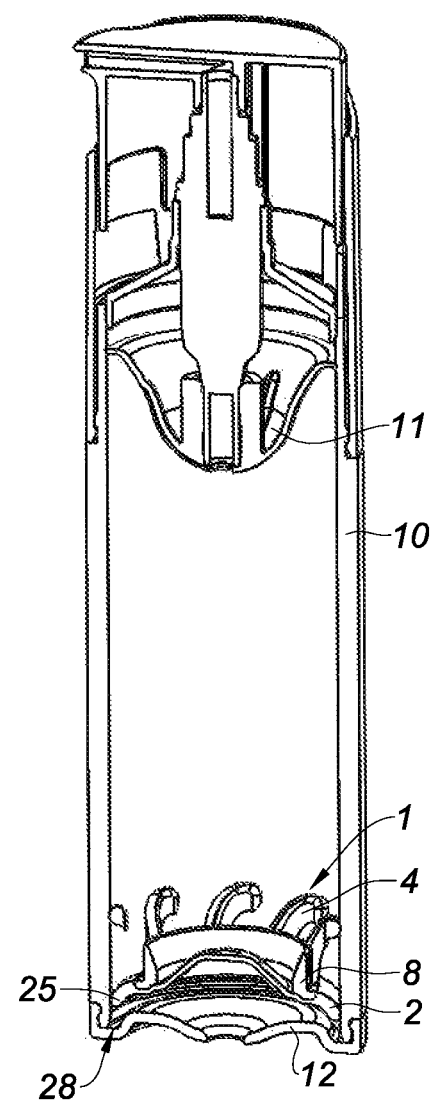
Figure 14C:
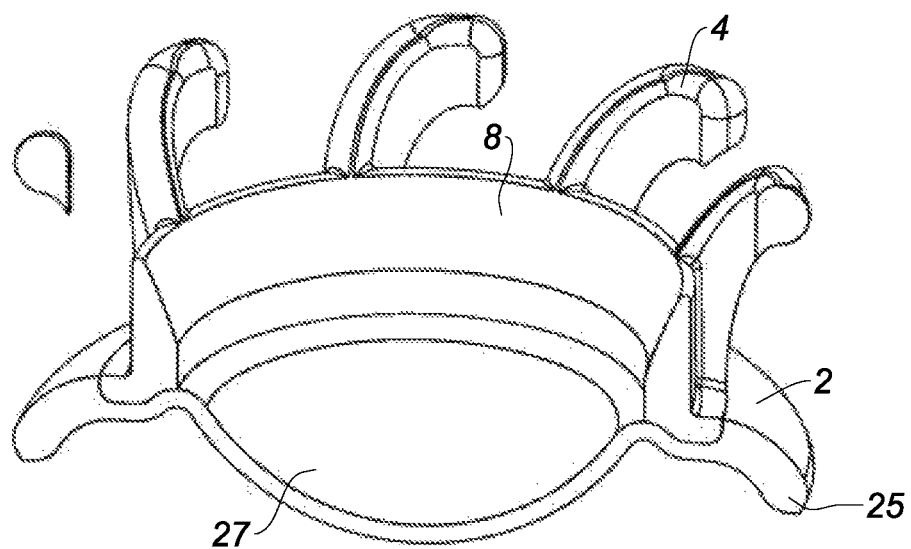

The thirteenth embodiment of the piston 1 according to the invention, represented in FIGS. 14a to 14c, is close to the twelfth embodiment, and makes it possible to overcome the disadvantage of the voluminous piston.

The piston 1 presents a circular cross-section.

The piston 1 includes a cylindrical base 8, corresponding to a crown. The guiding tabs 4 extend from the outer surface of the crown. These tabs 4 are oriented tangentially to the base 8, all of them in the same direction of rotation.

The central part of the crown is empty. More specifically, the crown defines a central cavity.

The sealing means 2 consist of a flexible disk 2, the periphery of which is curved in the opposite direction to the tabs, said periphery forming a sealing lip 25. The base 8 is mounted on said disk 2.

This disk 2 presents a central part 27 with a convex profile, penetrating inside the central cavity of the base 8. This central part 27 corresponds to a dome 27. This flexible dome 27 is thus located at the centre of the rigid base 8. The dome 27 is thus hidden inside the base 8, and is not visible from the exterior of the reservoir 10. The piston 1 is thus much less voluminous than in the previous embodiment. This is, in particular, represented in FIGS. 14a and 14b.

This central part 27 of the disk 2 is flexible enough to be able to be inverted under the effect of a force applied to the top of the dome. In this case, the central part 27 takes a concave profile, like that of the twelfth embodiment. Generally, the force will be applied by a bleed ring 11 located in the upper part of the reservoir 10, and having a complementary form to that of the piston 1, as is explained in the twelfth embodiment. In this case, the bleed ring 11 will have a complementary form to that of the inverted dome of the disk 2. Thus, as the piston 1 moves closer to the top position, the dome 27 comes into contact with the bleed ring 11 and is progressively inverted to adopt, at the end of the motion of the piston, an inverted curvature, which enables to obtain a complementary of the forms of the piston 1 and the bleed ring 11, to maximise the dispensing rate of the product. The inverted dome is represented in FIG. 14c.

In the ninth embodiment, the twelfth embodiment and the thirteenth embodiment, the sealing means 2 are formed by a sealing lip (reference 25 and end of the sleeve 30) that comes into contact with the inner wall of the reservoir 10. This lip is curved, which ensures it with a greater flexibility and makes it possible to absorb the difference between the lower and upper diameters of the reservoir 10. Indeed, the reservoir 10 is a moulded part and presents an inner draught required for the demoulding of the part. There can therefore be dimensional deviations within the reservoir 10.

In addition, the curved shape of the sealing part is less visible than a shape presenting sharp edges as it does not diffract light as much. Consequently, the sealing lip is very discrete through the reservoir 10.

Preferably, in the embodiments that include a sealing lip, the bottom 12 of the reservoir 10 is an added part snap-fitted in the body of the reservoir, as illustrated in FIGS. 13b and 14b. This bottom could also be overmoulded with the body of the reservoir or simply be integral with the body of the reservoir.

This bottom 12 has a complementary form of that of the piston 1 in order to support the bottom part of the sealing lip, so as to resist to a sealing test in a vacuum or to a leaking of a product that has a tendency to expand. In this case, during a test conducted in a vacuum, the airless vial filled with a product and with the piston in a low position is placed in a vacuum enclosure, aiming to simulate for example the pressure conditions in an aircraft luggage hold generally at a low pressure, and a possible leak of the product is detected during the test. The depressurisation is transmitted to the piston through an orifice at the bottom of the vial.

According to the prior art, follower pistons of airless systems are generally constituted of two superimposed lips and at a distance from one another. As the product in the reservoir is at atmospheric pressure, the lower lip opens and loses the contact with the inner wall of the reservoir under the effect of the vacuum. The vacuum communicates to the space between the two lips. The upper lip, contrary to the lower lip, is tightly pressed against the wall, thus preventing a leakage of the product.

The piston 1 according to the invention only includes a single lip, similar to the lower lip according to the prior art, which further presents a curvature favouring during the test its opening, and which therefore does not benefit from the upper lip in terms of leakage resistance under vacuum conditions.

To overcome this issue, the bottom 12 of the vial includes a peripheral recess 28 wherein the lip of the piston is housed, preventing it from undergoing deformations and losing contact with the wall of the reservoir in the case of depression.

Preferably, in all of the embodiments, the piston 1 is designed in a material that has microbiocidal properties.

The microbiocide properties of the material can be achieved by diffusion, in the product, of an antimicrobial agent, for example with an organic basis such as Triclosan (commercial name of company Melcoplast) or with a sliver, or mineral basis. In particular, the material can include at least one polyolefin, for example polyethylene, polypropylene and/or polystyrene, which is loaded with at least one antimicrobial agent.

The microbiocide properties of the material can also be obtained by placing the product in contact with a microbiostatic agent, for example by using a metallic material such as a copper or zinc alloy or a material including at least one polyolefin loaded with said metallic particles or having undergone surface treatment with fluoride, galvanisation or copper plating.

The microbiocide properties of the material can also be obtained by irradiating the piston with a suitable radiation wavelength, in particular with a material that has photoluminescence properties after exposure to outside light. In particular, the material can be based on at least one polyolefin loaded with at least an additive able to emit photoluminescent radiation that presents a wavelength included between 250 and 260 nanometres, and in particular of 254 nanometres, which corresponds to the scale of ultraviolet germicide irradiation.

As regards the description above, the optimal dimensional relations for the parts of the invention, including the variations of size, of materials, of forms, of functions and of operating modes, of assembly and of use are considered to be apparent and obvious to a person skilled in the art, and all relations equivalent to what is illustrated in the drawings and described in this application are intended to be included in the scope of the present invention.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:
1. A piston, comprising:
   a base, comprising:
      a concave base central part;
      an outer surface; and
      a plurality of guiding tabs extending from the outer surface and oriented tangentially away from the outer surface, each of said plurality of guiding tabs comprising a free end; and
      a rounded form on the free end of each of the plurality of guiding tabs;
   a flexible disk, comprising:
      a concave disk central part; and
      a sealing lip extending away from the concave disk central part;
   wherein the concave base central part is seated in the concave disk central part.

2. The piston of claim 1, wherein the sealing lip further comprises a periphery curved in a direction away from the plurality of guiding tabs.

3. The piston of claim 1, wherein the base is molded from a material selected from the group consisting of polyethylene, propylene, and polystyrene.

4. The piston of claim 1, wherein the base and the flexible disk are molded together in a bi-injection process.

5. A piston, comprising:
   a base, comprising:
      a concave base central part;
      an outer surface; and
      a plurality of guiding tabs extending from the outer surface and oriented tangentially away from the outer surface, each of said plurality of guiding tabs comprising a free end;
   a flexible disk, comprising:
      a concave disk central part; and a sealing lip extending away from the concave disk central part and having a periphery with a diameter Ø;

a distance H between the free end of one of said plurality of guiding tabs and the periphery of the sealing lip directly beneath said free end; and wherein H/Ø is greater than ¼.

6. The piston of claim 5, further comprising a space defined by a path starting at the periphery, moving along a surface of the sealing lip to the outer surface, moving along the outer surface and a lower surface of the plurality of guiding tabs to the free end of each of said plurality of guiding tabs, and moving back to the periphery, wherein the volume of the space comprises less than 3 ml.

7. The piston of claim 5, further comprising a space defined by a path starting at the periphery, moving along a surface of the sealing lip to the outer surface, moving along the outer surface and a lower surface of the plurality of guiding tabs to the free end of each of said plurality of guiding tabs, and moving back to the periphery, wherein the volume of the space comprises less than 2 ml.

8. The piston of claim 5, wherein the crown is molded from a material selected from the group consisting of polyethylene, propylene, and polystyrene.

9. The piston of claim 5, wherein the crown and the flexible disk are molded together in a bi-injection process.

10. A piston, comprising:
a base, comprising:
   a concave base central part;
   an outer surface; and
   a plurality of guiding tabs extending from the outer surface and oriented tangentially away from the outer surface, each of said plurality of guiding tabs comprising a free end with a skid-type surface on each free end;
a flexible disk, comprising:
   a concave disk central part; and
   a sealing lip extending away from the concave disk central part;
wherein the concave base central part is seated in the concave disk central part.

* * * * *